United States Patent Office 3,376,270
Patented Apr. 2, 1968

3,376,270
POLYAMIDES FROM XYLYLENE DIAMINES AND PHENYLINDAN DICARBOXYLIC ACIDS
James S. Ridgway, Durham, N.C., assignor to Monsanto Company, St. Louis, Mo., a corporation of Delaware
No Drawing. Continuation-in-part of application Ser. No. 457,828, May 21, 1965. This application Dec. 16, 1966, Ser. No. 602,121
5 Claims. (Cl. 260—78)

ABSTRACT OF THE DISCLOSURE

Copolyamides are produced from hexamethylene diamine, adipic acid, xylylene diamine and a phenylindan dicarboxylic acid. These polyamides are useful in the fabrication of textile fibers which are characterized by having good sonic modulus retention.

CROSS-REFERENCES TO RELATED APPLICATIONS

This application is a continuation-in-part of Ser. No. 457,828, filed May 21, 1965.

BACKGOUND OF THE INVENTION

(1) Field of the invention

This invention relates to copolyamides produced from dicarboxylic acids and diamines.

(2) Description of the prior art

Polyamides, such as polyhexamethylene adipamide (nylon 66) and polycaproamide (nylon 6) are well known in the art and have found significant commercial success both as textile fibers and as reinforcing fibers, such as tire cord. Although the textile fibers obtained from the previously known fiber-forming polyamides heretofore known are of great value, much research effort is being continuously expended in order to improve their properties. For example, previously known polyamides are opaque in appearance. In some commercial uses, for example, packaging material and fishing lines, it is desirable that the polyamide textile fibers be transparent. Furthermore, while, as pointed out above, previously known polyamides have found significant use in the reinforcement of rubber articles such as vehicle tires, an inherent drawback in their use to reinforce vehicle tires is their tendency to flatspot. Flatspotting is a term used to describe the out-of-roundness than occurs when a polyamide reinforced vehicle tire is allowed to rest for a period of time. That portion of the tire which is in contact with the pavement becomes flattened and, when the vehcle is started again this flat spot causes vibration of the vehicle. While this phenomena of flatspotting is not completely understood, it is thought that it is related to heat and moisture stability. There is, therefore, at present a great deal of effort being put into finding polyamides which have increased heat and moisture stability.

SUMMARY OF THE INVENTION

The copolyamides of the present invention are useful in the production of shaped articles by extrusion, molding or casting in the nature of yarns, fabrics, films, pellicles, bearings, ornaments or the like. They are particularly useful in the production of textile fibers and as reinforcing cords produced therefrom.

The present invention provides a novel linear fiber-forming copolyamide composed of (A) 70 to 98 mole percent, based on the molecular weight of the copolyamide, of units represented by the structure

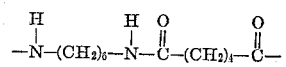

(B) 30 to 2 mole percent, based on the molecular weight of the copolyamide of units represented by the structure

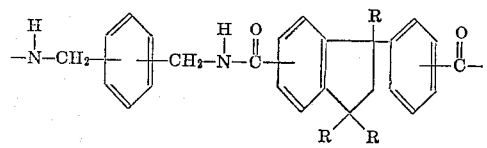

wherein R is a member of the group consisting of hydrogen and alkyl groups containing 1 to 3 carbon atoms.

In a typical preparation the copolyamide is formed by interpolymerizing the desired proportions of adipic acid, hexamethylene diamine, xylylene diamine and a phenylindan dicarboxylic acid. The acids and diamines may be added to the polymerization step as such or, as is preferred, they may be added in the form of salts prepared from one of the acids and one of the diamines. In any event, the amount of each component added to the polymerizer is determined by the amount desired in the copolymer product. Generally, the amounts of xylylene diamine and phenylindan dicarboxylic acid added to the polymerization step is sufficient to provide from 2 to 30 mole percent in the copolymer of units having the structure

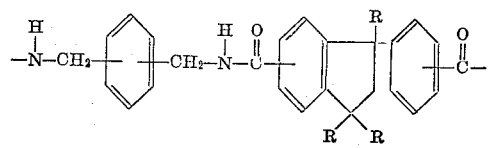

wherein R is defined above. It has been found that at least about 2 mole percent is needed in order that the advantageous effects be realized. Amounts greater than 30 mole percent are usually to be avoided since the tenacity and melting point of the copolymer are adversely affected. The preferred amount of these units is between 5 and 20 mole percent.

The copolyamides of this invention are prepared by procedures well known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties, which properties are reached when the copolyamide has an intrinsic viscosity of at least 0.4 The reaction can be conducted at superatmospheric, atmospheric, or subatmospheric pressure. Often it is desirable, especially in the last stage of the reaction, to employ conditions, e.g. reduced pressure, which will aid in the removal of the reaction by-products. Preferably, the reaction is carried out in the absence of oxygen, for example, in an atmosphere of nitrogen.

Intrinsic viscosity as employed herein is defined as $$C \xrightarrow{\text{Lim}} 0 \left( \frac{\log_e \eta_r}{C} \right)$$

in which $\eta_r$ is the relative viscosity of a dilute solution of the polymer in m-cresol in the same units at the same temperature and C is the concentration of grams of polymer per 100 cc. of solution.

The phenylindan dicarboxylic acids which are employed in the preparation of the copolymers of the present invention may be represented by the formula:

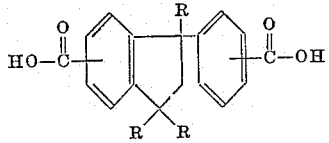

wherein R is as defined above. Typical suitable compounds falling within this formula are: 3-(4-carboxyphenyl)-5-indan carboxylic acid; 3-(3-carboxyphenyl)-5-indan carboxylic acid; 3-(4-carboxyphenyl)-1,1,3-trimethyl-5-indan carboxylic acid; 3-(3-carboxyphenyl)-1,1,3-triethyl-6-indan carboxylic acid; 3(4-carboxyphenyl)-1-methyl-1,3-dipropyl-5-indan carboxylic acid; 3-(4-carboxyphenyl)-1-methyl-1,3-diethyl-6-indan carboxylic acid, and the like. The preferred phenylindan dicarboxylic acid for the preparation of the copolyamides of this inevntion is 3-(4-carboxyphenyl)-1,1,3-trimethyl-5-indan carboxylic acid which is represented by the formula:

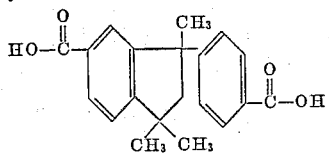

The xylylene diamine employed in producing the copolymers of the present invention may be either the meta- or the para-isomer.

DESCRIPTION OF THE PREFERRED EMBODIMENTS

In Examples 1–5 copolymers were prepared having the indicated mole percent of components. (66 represents hexamethylene adipamide units and MXD-PDA represents units from meta-xylylene diamine and 3-(4-carboxyphenyl)-1,1,3-trimethyl-5-indan carboxylic acid.) In each example the amount of each component employed was determined by its desired mole percentage in the copolymer. Salts of (1) hexamethylene diamine and adipic acid, (2) hexamethylene diamine and 3-(4-carboxyphenyl)-1,1,3-trimethyl-5-indan carboxylic acid and (3) meta-xylylene diamine and adipic acid were dissolved in water and the resulting solution was placed in a stainless steel, high pressure autoclave which had been previously purged with nitrogen. The temperature and pressure within the autoclave were slowly raised until values of 220° C. and 250 p.s.i.g., respectively, were reached. The temperature was then further increased to 243° C. while the pressure was maintained at 250 p.s.i.g. by removal of steam condensate. The pressure was then gradually reduced to atmospheric over a 25-minute period. The temperature was allowed to level at 280° C. and the polymer allowed to equilibrate for 30 minutes. The polymer was melt spun directly from the bottom of the autoclave to yield a mono-filament yarn having good textile properties. The increased stability to heat and moisture was demonstrated by the percent retention of sonic modulus at rising temperatures, as shown in Table I and Table II.

TABLE I (0% RH)

| Example | Mole percent 66 | Mole percent PXD-PDA | Sonic Modulus at 30° C. | Percent Retained at— | | | | |
|---|---|---|---|---|---|---|---|---|
| | | | | 50° C. | 80° C. | 110° C. | 130° C. | 150° C. |
| 1 | 100 | 0 | 59.26 | 94 | 80 | 63 | 55 | 33 |
| 2 | 95 | 5 | 44.08 | 97 | 85 | 74 | 63 | 48 |
| 3 | 90 | 10 | 45.20 | 90 | 83 | 76 | 64 | 40 |
| 4 | 85 | 15 | 45.20 | 90 | 87 | 76 | 67 | 52 |
| 5 | 80 | 20 | 40.79 | 94 | 92 | 80 | 66 | 49 |

TABLE II (30% RH)

| Example | Sonic Modulus at 30° C. | Percent Retained at— | | | |
|---|---|---|---|---|---|
| | | 45° C. | 60° C. | 75° C. | 90° C. |
| 1 | 75.22 | 83 | 70 | 57 | 48 |
| 2 | 47.48 | 96 | 83 | 69 | 61 |
| 3 | 50.31 | 92 | 81 | 71 | 63 |
| 4 | 47.48 | 91 | 86 | 79 | 67 |
| 5 | 40.79 | 92 | 92 | 80 | 71 |

The results shown in Table I and II conclusively indicate that the copolyamides of present invention are far superior, in regard to their heat and moisture stability, than the conventional nylon 66. Furthermore, while the polyamide of Example I above was opaque in appearance, those of Examples 3–5 were completely transparent and that of Example 2 was nearly transparent. As stated above, polyamides which are transparent find many commercial uses for which, conventional, opaque polyamides are not suitable.

In Examples 6–8 copolymers were prepared as described for Examples 1–5 with the exception that the xylylene diamine employed was the para-isomer. (PXD-PDA represents units from para-xylylene diamine and 3-(4-carboxyphenyl)-1,1,3-trimethyl-5-indan carboxylic acid). The heat and moisture stability of these copolymers is indicated in Tables III and IV.

TABLE III (0% RH)

| Example | Mole percent 66 | Mole percent PXD-PDA | Sonic Modulus at 30° C. | Percent Retained at— | | | | |
|---|---|---|---|---|---|---|---|---|
| | | | | 50° C. | 80° C. | 110° C. | 130° C. | 150° C. |
| 6 | 95 | 5 | 44.1 | 92 | 89 | 74 | 67 | 57 |
| 7 | 90 | 10 | 43.0 | 93 | 89 | 80 | 70 | 57 |
| 8 | 85 | 15 | 38.3 | 96 | 84 | 85 | 76 | 65 |

TABLE IV (30% RH)

| Example | Sonic Modulus at 30° C. | Percent Retained at— | | | |
|---|---|---|---|---|---|
| | | 45° C. | 60° C. | 75° C. | 90° C. |
| 6 | 47.5 | 88 | 76 | 67 | 58 |
| 7 | 43.0 | 91 | 80 | 76 | 65 |
| 8 | 40.8 | 88 | 80 | 75 | 67 |

Again, these results indicate the superiority of the copolyamides of this invention. In the case of the copolyamides using para-xylylene diamine, all of the copolymers were completely transparent.

I claim:
1. A linear, fiber-forming copolyamide composed of (A) 70 to 98 mole percent based on the molecular weight of the copolyamide of units represented by the structure

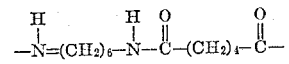

and (B) 30 to 2 mole percent based on the molecular weight of the copolyamide of units represented by the structure

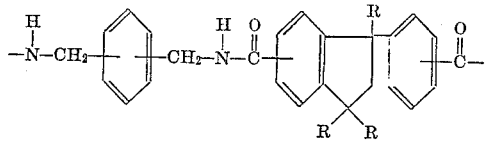

wherein R is a member of the group consisting of hydrogen and alkyl groups containing 1-3 carbon atoms.

2. The linear, fiber-forming copolyamide as defined in claim 1 wherein R is methyl.

3. The linear, fiber-forming copolyamide as defined in claim 1 wherein component (A) comprises 95 to 80 mole percent and component (B) comprises 5 to 20 mole percent of the copolyamide.

4. The linear, fiber-forming copolyamide as defined in claim 3 wherein R is methyl.

5. A textile fiber of the copolyamide of claim 1.

References Cited

UNITED STATES PATENTS

| | | | |
|---|---|---|---|
| 2,715,620 | 8/1955 | Carlston et al. | 260—78 |
| 2,918,454 | 12/1959 | Graham | 260—78 |
| 3,012,994 | 12/1961 | Bell et al. | 260—78 |

WILLIAM H. SHORT, *Primary Examiner.*

H. D. ANDERSON, *Assistant Examiner.*